Oct. 11, 1932.    E. WITTCOFF    1,882,468
SEAT COVER
Filed Aug. 10, 1931    2 Sheets-Sheet 1
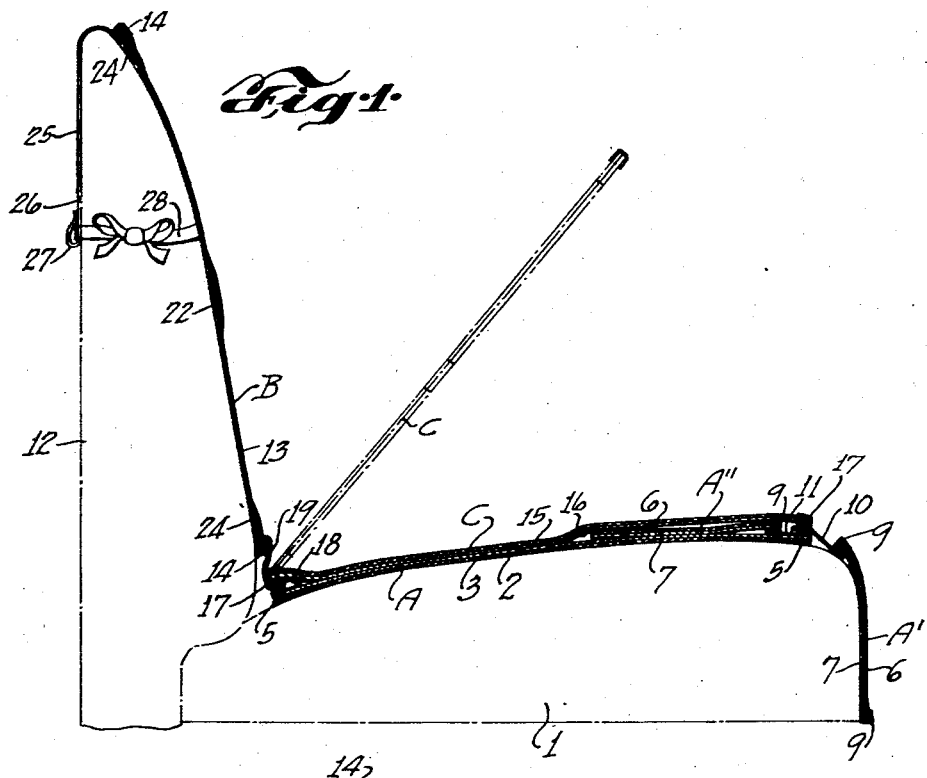
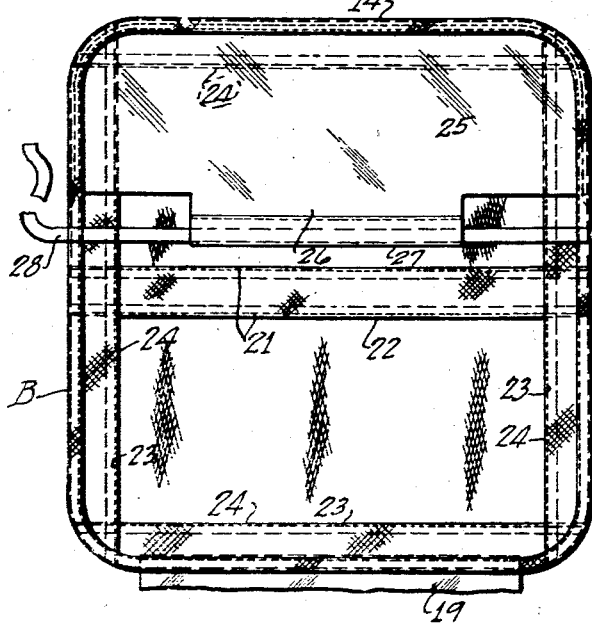
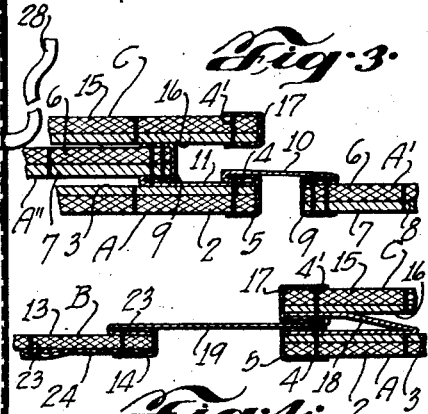
INVENTOR
Edward Wittcoff.
By
ATTORNEY Oct. 11, 1932.  E. WITTCOFF  1,882,468
SEAT COVER
Filed Aug. 10, 1931   2 Sheets-Sheet 2
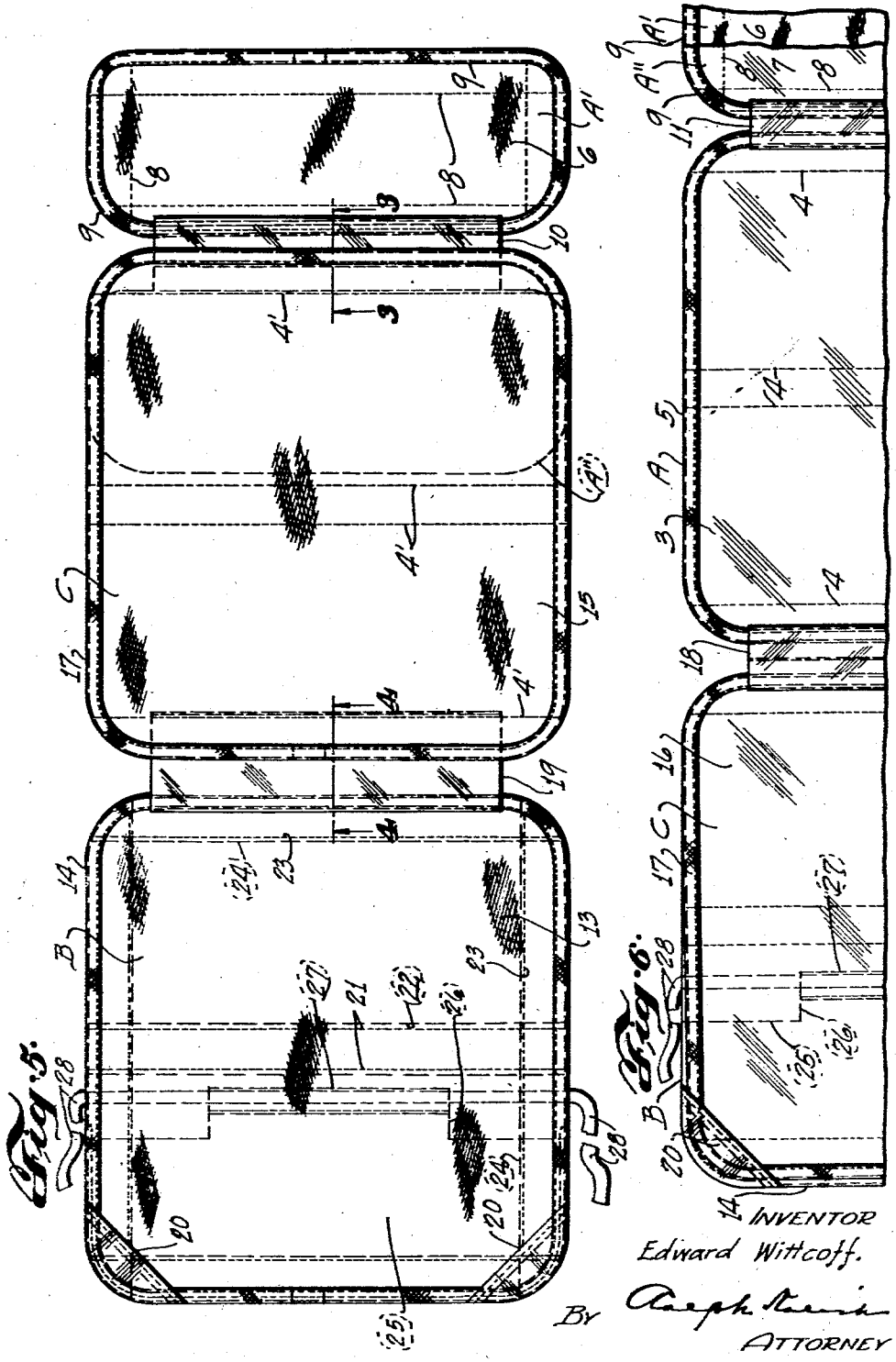
INVENTOR
Edward Wittcoff.
By
ATTORNEY Patented Oct. 11, 1932

1,882,468

UNITED STATES PATENT OFFICE

EDWARD WITTCOFF, OF UNIVERSITY CITY, MISSOURI, ASSIGNOR TO EVR KLEAN SEAT PAD COMPANY, OF ST. LOUIS, MISSOURI, A CORPORATION OF MISSOURI

SEAT COVER

Application filed August 10, 1931. Serial No. 556,212.

This invention relates generally to seat-covers and has more particular reference to a portable seat cover for automobile seats, chairs, and the like.

My invention has for its chief object the provision of an efficient, inexpensive, conveniently handled double-purpose portable seat cover for automobile seats, chairs, or the like, my new cover having the capability of presenting one type of surface, as, for instance, an all matting wearing surface, for summer use or interchangeably or alternatively, by a simple manipulation, presenting a different type of surface, as, for instance, an all leather wearing surface, highly suitable for winter use.

And with the above and other objects in view, my invention resides in the novel features of form, construction, arrangement, and combination of parts hereinafter described and pointed out in the claims.

In the accompanying drawings (two sheets),

Figure 1 is a sectional side elevational view of a seat-cover embodying my invention as applied to and upon an upholstered automobile seat, chair, or the like;

Figure 2 is a rear elevational view of the back-member of the seat-cover, other parts being broken away;

Figure 3 is a fragmentary enlarged detail sectional view taken approximately on the line 3—3, Figure 5, showing the hinge-construction connecting the seat and front members of the cover;

Figure 4 is a similar view taken approximately on the line 4—4, Figure 5, showing the hinge construction connecting the back-member, the seat-member, and the intermediately disposed supplemental member of the cover;

Figure 5 is a horizontally extended top plan view of the seat cover with the supplemental member folded upon the seat-member and one of the front-members folded inwardly therebetween and the other extended for presenting an ll-matting wearing surface; and Figure 6 is a horizontally extended approximately half top plan view of the seat cover with the supplemental member folded upon the back-member and both of the front members extended from the seat member for presenting an all-leather wearing surface.

Referring now more in detail and by reference characters to the drawings, which illustrate a preferred embodiment of my invention, my new seat-cover includes a seat-member or section A, a front portion or, as it may be designated, a valance comprising members or sections A' and A", a back-member or section B, and an intermediate supplemental seat-back member or section C, all hingedly connected as presently appearing so that the several members, when the cover is not in use, may be conveniently compactly folded one upon the other to occupy small space for ready portability, or for use, conveniently unfolded or expanded, as I may say, to substantially cover the seat, back, and front of an automobile seat or the like.

The seat-section A, as its name implies, is adapted, when the cover is in use, for disposition upon the seat proper or cushion 1 of the automobile-seat, chair, or the like, and its body is composed of a preferably two-ply mat of approximately rectangular shape or outline, of which the one ply or backing 2 thereof is preferably constructed of any suitable somewhat stiff yet flexible material, such as woven matting of fibre, paper, straw, or the like, while the other ply 3 thereof is constructed of preferably a contrasting relatively non-porous flexible material, such as leather or its imitations, textile fabric, or the like, the two members or plies 2 and 3 being suitably, as by spaced transverse rows of stitching 4, permanently secured together in flatwise registering relation.

As so constructed, the backing 2 provides the necessary stiffness for retaining the shape of the seat-member A when in use and is yet sufficiently pliable for readily flexing over the rounded contour of the cushion 1 and for yielding therewith to the body of a person occupying the seat.

At its corners, the seat-member A is preferably nicely rounded, as shown, and at their margin, the matting 2 and leather-ply 3 are further sewed together and enclosed by a preferably continuous strip of folded-over edging or binding 5 composed of any suitable flexible material, such as leather or its imitations, textile fabric, or the like.

The members A', A", of the valance are adapted interchangeably for normally depending over the cushion 1, as best seen in Figure 1. The valance members A', A", are each of approximately panel-like rectangular shape or outline with preferably rounded corners, as shown, and in structure are substantially similar to the structure of the seat-member A, each valance member A', A", including a corresponding matting or backing ply 6 and a corresponding wear-ply 7 secured permanently together, as by spaced rows of transverse stitching 8, in approximate flatwise registration and marginally finished by an edging or binding 9.

Having reference now to Figure 1, which shows the valance-member A' in depending relation over the front of the cushion 1 from the seat-member A, the member A' at its one or top margin is hingedly connected to the adjacent front margin of the seat-member A by a strip 10 of suitable flexible material preferably similar in structure to that of the wear-ply 7, the hinge-strip 10 at one side margin being suitably sewed under the binding 5 on the wear-ply 3 of the member A and at its opposite side margin being similarly sewed between the binding 9 and the backing-ply 6 of the member A'.

Likewise hingedly connecting the valance-member A" at its top margin to the adjacent front margin of the member A, is a strip 11 of suitable flexible material preferably similar to that of the strip 10, the hinge-strip 11 at one side margin being sewed under the adjacent binding 5 between the attached margin of the strip 10 and the wear-ply 3 of the member A and at its opposite side margin being sewed under the binding 9 on the wear-ply 7 of the member A".

Thus the backing-ply 6 and the wear-ply 7 of the so hingedly attached valance-members A' and A" are reversed with respect to matching correspondence with the plies of the main or seat-section A, for purpose presently appearing.

The back-member B, which in shape and size is like the member A, and which is adapted, when the cover is in use, to project or extend more or less uprightly for substantially covering the front face of the seat-back 12, includes only a single ply of corresponding matting 13 preferably rounded at its corners, as shown, and marginally finished by a corresponding binding 14.

The supplementary member C is similar in structure, shape, and size to the seat-member A, the member C including a corresponding matting or backing-ply 15 and a corresponding wear-ply 16 likewise permanently fixed together in approximate flatwise registering relation by means of spaced rows of thread stitches 4' and finished by a marginal binding 17.

Hingedly connecting the member C at one margin to the adjacent rear margin of the member A, is a strip 18 of flexible material preferably corresponding to the hinge-strips 10, 11, the hinge-strip 18 being at one side margin suitably sewed under the binding 17 on its leather or near-ply face 16 and at its opposite side margin sewed under the binding 5 also on the leather or wear-ply face 3 of the member A. Thus the respective wear-ply faces 3 and 16 of the members A and C are in opposed relation.

And hingedly connecting the member C at its said one margin to an adjacent margin of the back-member B is a strip 19 of flexible material preferably also corresponding to the hinge-strips 10, 11, 18, the hinge-strip 19 being at one side margin suitably sewed under the binding 17 along one side margin of the member B and at its opposite side margin being sewed to the member C preferably between its wear-ply face and the attached hinge-strip 18, as shown.

As so connected, the matting face 15 of member C is in matching opposed relation to the back-member B and the wear-ply face 16 of member C is in matching opposed relation to the wear-ply face 3 of the seat-member A, the substantially conjoined hinge-strips 18, 19, serving also to hingedly connect the seat and back-members A and B at adjacent margins. And as so hingedly connected, the intermediate member C is adapted for selective swingable actuation relatively to the members A and B for alternately or interchangeably overlying the seat-member A when in approximate horizontal position, as in Figure 1, or overlying the back-member B when in approximate vertical position, as suggested in dot-dash lines, in Figure 1.

Diagonally disposed respectively across the opposite upper or relatively distant corners of the back member B on the front or wearing face thereof, are suitably sewed or secured strips of preferably binding material forming pockets 20 for reception of the corresponding corners of the free margin of the member C for removably retaining the member C in approximate vertical back-covering position.

Transversally disposed upon, and sewed, as at 21, to, the rear-face of the back member B, is a reinforcing-strip 22 of suitable webbing, binding-material, or the like, its opposite ends being preferably sewed to and under the adjacent binding 14. And also disposed along the four sides of, and sewed, as at 23, upon the rear face of the back-member B, are marginal reinforcing strips 24 having their outer side edges sewed also to and under the adjacent binding 14.

Suitably marginally sewed or attached to the free margin of the back-member B, and having a margin infolded between the binding 14 and the rear face of the matting 13, is a seat-top back-apron 25 constructed of a suitable flexible or textile material adapted to be draped over the top of the seat-back 12, the apron 25 terminating in a depending flap 26 formed with a so-called tunnel-loop 27 carrying a draw-string 28 or the like adapted to be passed around the seat-back 12 for tying the apron 25 thereto.

In use, the seat-cover is draped on the seat to be protected, with the seat-member A disposed approximately horizontally flatwise upon the seat-cushion 1 and the back-member B disposed approximately vertically flatwise upon the seat-back 12, the apron 25 being draped over the seat-back and detachably secured thereto by means of the drawstring 28, as shown in Figure 1.

For summer use, the supplementary member C is folded down upon the seat-member A and the valance member A'' is folded inwardly therebetween, thus providing an all matting-wearing surface composed of the matting face 13 of the member B, the confronting matting face 15 of the member C, and the front-wise exposed matting face 6 of the valance-member A', as shown in Figures 1 and 5.

For winter use, the supplementary member C may be folded upwardly upon the back-member B and the valance-member A'' folded downwardly over the valance-member A', thereby providing an all-leather wearing surface composed of the wear face 16 of the member C, the confronting wear face 3 of the member A, and the frontwise exposed wear face 7 of the member A'', as shown in Figure 6.

It will thus be seen that my seat-cover provides when in one position a porous ventilated seat-covering most cool and comfortable to a person occupying the seat especially during the hot summer season, and when in another position a substantially non-porous and hence warm and comfortable seat covering highly suitable for use during the cold winter season, the flexible strips connecting the members A, B and C permitting endwise movement of the member C relatively to either the member A or B so as to smoothly substantially throughout its area flatwise overlie either the member A or B, as the case may be.

My new seat-cover is simple in structure, may be inexpensively manufactured, is quite durable, is readily handled and conveniently converted to present one or the other of its interchangeable wearing surfaces, is neat and attractive in presenting either of its selected surfaces, and is efficient in the performance of its intended functions.

It will be understod that changes and modifications in the form, construction, arrangement, and combination of parts of the several parts of the cover may be made and substituted for those herein shown and described without departing from the nature and principle of my invention.

Having thus described my invention, what I claim and desire to secure by Letters Patent is—

1. A portable back and seat cover comprising a seat-member, a back-member having hinged connection with the seat-member, a supplemental member intermediately swingably mounted between the seat and back members for selective disposition approximately flatwise upon the seat or back member, the back-member presenting a face of a first material, the seat-member presenting a face of a second material, and the supplemental member presenting a face of the first material towards the back-member and a face of the second material towards the seat-member, and a valance including a pair of members hingedly connected to the seat-member for foldable actuation over or from the seat-member, one of said valance-members when unfolded presenting a face of the first material and the other valance-member when unfolded presenting a face of the second material.

2. A back-and-seat cover comprising, in combination, a seat-member, a supplemental member having distinguishable backing and wearing faces, one of which is similar to the wearing face of the seat-member, the supplemental member being hinged to the seat-member for selectively when folded overlying the seat-member for exposing its backing-face and when unfolded exposing its wearing face and the similar wearing face of the seat-member, and a valance including a pair of members each having distinguishable backing and wearing faces corresponding to the respective backing and wearing faces of the intermediate member, said valance members being hingedly attached to the seat-member for selective foldable movement for presenting their respective backing and face members in matching relation to the backing and wear faces of the seat-member.

3. A removable cover for a seat and its back comprising, in combination, a seat-member, a back-member, an intermediate-member, and flexible strips connecting the seat, back, and intermediate members for swingable and endwise movement of the intermediate member relatively to the seat and back members, each of said members having a body portion of matting, the seat and back members having wear surfaces of different material, and the intermediate member having on its opposite sides wear surfaces of material corresponding to the exposed wear surfaces of the adjacent seat and back members, the intermediate member being selectively shiftable for overlying the seat or back member for presenting a wear surface in matching relation to the then exposed wear surface of the seat or back member.

4. A removable cover for a seat and its back comprising, in combination, a seat-member, a back-member, an intermediate-member, and flexible strips connecting the seat, back, and intermediate members for swingable and endwise movement of the intermediate member relatively to the seat and back members, said members each including a matting body-portion and said seat and intermediate members each having a matching wear surface of fabric disposed flatwise over one face of and fixed to its said matting body-portion, the intermediate member being selectively shiftable for overlying the seat or back member for presenting a wear surface in matching relation to the then exposed wear surface of the seat or back member.

5. A removable cover for a seat and its back comprising, in combination, a seat-member, a back-member, an intermediate-member, and flexible strips connecting the seat, back, and intermediate members for swingable and endwise movement of the intermediate member relatively to the seat and back members, said members each including a matting body-portion and said seat and intermediate members each having a matching wear surface of fabric disposed flatwise over one face of and fixed to its said matting body-portion, the intermediate member being selectively shiftable for overlying the seat or back member for presenting a wear surface in matching relation to the then exposed wear surface of the seat or back member, and pocket-forming strips on the back-member for retaining the intermediate member in back-member overlying position.

In testimony whereof, I have signed my name to this specification.

EDWARD WITTCOFF.